United States Patent
Kamepalli et al.

(10) Patent No.: US 10,401,932 B2
(45) Date of Patent: Sep. 3, 2019

(54) DISPLAY BASE WIRELESS CHARGING PAD AND INTEGRATED CHARGER CONTROL

(71) Applicant: Dell Products L.P., Round Rock, TX (US)

(72) Inventors: Srinivas Kamepalli, Austin, TX (US); Gregory L. Henderson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 137 days.

(21) Appl. No.: 15/366,328

(22) Filed: Dec. 1, 2016

(65) Prior Publication Data

US 2018/0157300 A1 Jun. 7, 2018

(51) Int. Cl.
| | | |
|---|---|---|
| G06F 1/00 | (2006.01) | |
| G06F 1/26 | (2006.01) | |
| G06F 1/3234 | (2019.01) | |
| G06F 13/24 | (2006.01) | |

(52) U.S. Cl.
CPC .......... G06F 1/266 (2013.01); G06F 1/3265 (2013.01); G06F 13/24 (2013.01)

(58) Field of Classification Search
CPC ......... G06F 1/266; G06F 1/3265; G06F 13/24
USPC ......... 713/340, 300, 310, 322; 307/104, 149
See application file for complete search history.

(56) References Cited

U.S. PATENT DOCUMENTS

| | | | | |
|---|---|---|---|---|
| 7,793,121 B2* | 9/2010 | Lawther | ................. | H02J 7/025 713/300 |
| 8,872,386 B2* | 10/2014 | Mach | ........................ | H02J 5/00 307/104 |
| 8,898,489 B2* | 11/2014 | Sultenfuss | ............ | G06F 1/1632 713/300 |
| 8,946,939 B2* | 2/2015 | Drennen | ................. | H02J 7/025 307/104 |
| 10,148,115 B2* | 12/2018 | Sultenfuss | .............. | H02J 7/025 |
| 2013/0088192 A1* | 4/2013 | Eaton | ...................... | G06F 1/266 320/108 |
| 2013/0241302 A1* | 9/2013 | Miyamoto | .............. | H02J 50/12 307/104 |
| 2013/0290764 A1* | 10/2013 | Taki | ........................ | G06F 1/266 713/340 |
| 2013/0310112 A1* | 11/2013 | You | ................... | H04W 52/0267 455/566 |
| 2013/0311798 A1* | 11/2013 | Sultenfuss | .............. | H02J 7/025 713/310 |
| 2014/0225560 A1* | 8/2014 | Walley | ................ | H01M 2/0267 320/108 |
| 2014/0245036 A1* | 8/2014 | Oishi | ................... | H04B 5/0037 713/300 |
| 2014/0331067 A1* | 11/2014 | Chen | ....................... | G06F 1/266 713/322 |

(Continued)

*Primary Examiner* — Aurel Prifti
(74) *Attorney, Agent, or Firm* — Zagorin Cave LLP; Robert W. Holland (57) ABSTRACT

A portable information handling system wirelessly charges from a charging pad powered from a source information handling system, such as by power transferred through a USB cable. Configuration information exchanged between the source information handling system and charging pad coordinates the power transfer, including the amount of power transfer and power transfer when the source information handling system is in a powered down state, such as an ACPI S3 or S5 state.

20 Claims, 4 Drawing Sheets

(56) References Cited

U.S. PATENT DOCUMENTS

| | | | |
|---|---|---|---|
| 2015/0045091 A1* | 2/2015 | Nakatani | H04B 5/0031 455/556.1 |
| 2015/0097447 A1* | 4/2015 | Washiro | H04B 5/0012 307/149 |
| 2015/0137746 A1* | 5/2015 | Lee | H02J 5/005 320/108 |
| 2015/0214745 A1* | 7/2015 | Yoon | H02J 17/00 307/104 |
| 2015/0288195 A1* | 10/2015 | Ashery | H02J 5/005 307/104 |
| 2015/0349537 A1* | 12/2015 | Milne | H02J 50/10 307/104 |
| 2016/0049993 A1* | 2/2016 | McCoy | H04B 5/0037 307/104 |
| 2017/0033608 A1* | 2/2017 | Bunsen | H02J 7/025 |
| 2017/0063431 A1* | 3/2017 | Milne | H02J 7/0054 |
| 2017/0256990 A1* | 9/2017 | Maniktala | H02J 50/12 |
| 2017/0293335 A1* | 10/2017 | Dunstan | G06F 1/266 |

\* cited by examiner

DISPLAY BASE WIRELESS CHARGING PAD AND INTEGRATED CHARGER CONTROL

BACKGROUND OF THE INVENTION

Field of the Invention

The present invention relates in general to the field of information handling system battery charging and management, and more particularly to a display base wireless charging pad and integrated charger control.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems generally accept power from an external power source and also store power with an integrated battery. When external power is available, a power manager in the portable information handling system charges the battery. In some instances, portable information handling systems have dedicated external chargers and power connectors; however, many low power systems use a common charging connector, such as a Universal Serial Bus (USB) port. The introduction of USB Type C ports has provided the ability to transfer up to 100 W of power so that a single shared data and power connection is available that reduces the need for a separate power port. Power and data cable connections tend to introduce vulnerability at information handling system housings at which contaminants may enter the system. In addition, cable connector and ports are vulnerable to breaking if an off axis pressure is applied by a user. These vulnerabilities tend to increase with portable information handling systems that have thin housings for small form factors.

The vulnerability of cable connectors and ports, especially in low profile portable information handling systems, has resulted in increased reliance by end users on wireless communication and power solutions. Wireless networks allow interactions with portable systems that do not rely upon hardwired connections. Portable systems typically include wireless local area network (WLAN) interface cards that support data transfer, such as file transfers, Internet communication and e-mail communication. Portable systems may also support wireless peripheral interactions, such as with Bluetooth keyboards or wireless display interfaces. Wireless communication generally provides adequate data transfer so that end users do not typically have reason to use a wired connection to a portable information handling system to accomplish data transfer in reasonable time frames. Wireless power transfer generally relies upon an inductive or resonance type charging mat that uses a current passing through a coil to transfer power to a receiving device in an information handling system. Opposing coils interact with electromagnetic fields to form an inductive coupling that is essentially an electrical transformer. Wireless charging provides a user with convenient battery charging when a portable information handling system is not in use since the user simply rests the portable information handling system on the charging mat. However, inductive power transfer has a limited range so that a user typically cannot use a system while charging.

One difficulty with wireless charging is that the wireless charging pad lacks an inherent data transfer with the device it is charging. For example, a wireless charging pad rests on a desktop and gets external power from a desktop information handling system through a USB cable. When an end user places a portable information handling system on the charging pad, the end user assumes that charging initiates automatically, however, the information handling system that sources power may have constraints that limit power transfer. For example, system power use, system power saving states, system thermal constraints or other factors may unexpectedly varying the availability of wireless charging and charging times. Since end users rely upon a full charge to use a portable information handling system without an external power cable, unreliable charging use models can introduce a poor end user experience.

SUMMARY OF THE INVENTION

Therefore, a need has arisen for a system and method which provide an information handling system wireless charging ecosystems having a reliable use model.

In accordance with the present invention, a system and method are provided which substantially reduce the disadvantages and problems associated with previous methods and systems for wireless charging management of information handling systems and other portable devices. A wireless charging pad interfaces with a source information handling system to obtain power for wireless transfer to a portable information handling system. The source information handling system and charge pad exchange configuration information that defines power transfer to the charge pad so that power transfer dynamically adjusts in a seamless manner as available power changes and source information handling system power state changes.

More specifically, an information handling system provides power to a wireless charging pad through a cable connection, such as a Type C USB connector. Power managers of the source information handling system and charging pad exchange configuration information that defines power transfer during varying power states of the source information handling system, such as ACPI power states S1-5. During a low power state of source information handling system, an interrupt or other communication from the charging pad enables power transfer based upon configuration information shared between power managers of the source information handling system and charging pad. In one example embodiment, time of day is applied by the power managers to establish power transfer so that portable systems have a full charge at a desired time, such as the start of a work day.

The present invention provides a number of important technical advantages. One example of an important technical advantage is that a portable device charges at a wireless charging pad during low power states of a source information handling system. For example, power transfer seamlessly continues to a charging pad as a source information handling system transitions between ACPI power states. Charge state and charge time of a portable information handling system are communicated and coordinated for presentation to an end user. Available power dynamically adjusts as load at the source information handling system changes. Power at a charging pad is initiated with a source information handling system in a low power state by issuing an interrupt to the source information handling system power manager and establishing power transfer based on stored charging pad configuration information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system supports power transfer to a charging pad with power management controls that adapt to information handling system power states. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
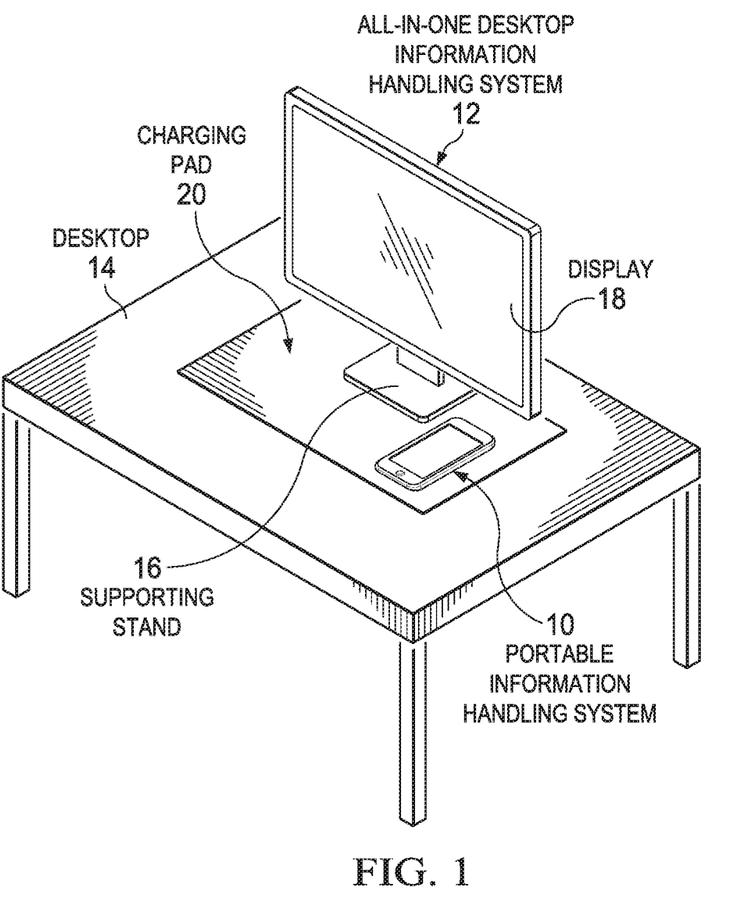
FIG. 1 depicts an information handling system having a charging pad integrated in a stand that charges portable information handling systems.

Referring now to FIG. 1, an information handling system 12 is depicted having a charging pad integrated in a stand that charges portable information handling systems 10. In the example embodiment, information handling system 12 is an all-in-one system having processing components and a display 18 integrated in a common housing having a tablet form factor. Information handling system 12 rest on a desktop surface 14 held in a viewing position by a supporting stand 16. A charging pad 20 is integrated in supporting stand 16 to provide wireless charging to portable information handling system 10 when portable information handling system is rested on supporting stand 16. Although the example embodiment depicts an all-in-one desktop information handling system 12, in alternative embodiments, a peripheral display stand or similar structure may integrate charging pad 20 and receive power from a host information handling system, or charging pad 20 may rest on desktop 14 as a separate peripheral interfaced with a host information handling system.

During operation, an end user places portable information handling system 10 on charging pad 20 to conveniently charge the portable system when not in use. Charging pad 20 receives power from the host information handling system 12, such as through a USB hub and port, so that application of power depends upon availability of power through the host power management system. To ensure the availability of power, host information handling system 12 and charging pad 20 exchange configuration information that defines power transfer settings during various power configurations of host information handling system 12. For example, configuration information defines power transfer settings established and maintained during reduced power states of host information handling system 12, such as in the event of an ACPI S3, S4 or S5 power transition. As another example, power available for charging pad 20 is determined based upon host information handling system load and coordinated with a charging portable information handling system 10 so that charge times are made available for an end user. Charging pad status is intelligently communicated between host and charging information handling systems by reference to configuration information to maintain charge pad 20 operations for various power state system power loading availability.

Figure 2:
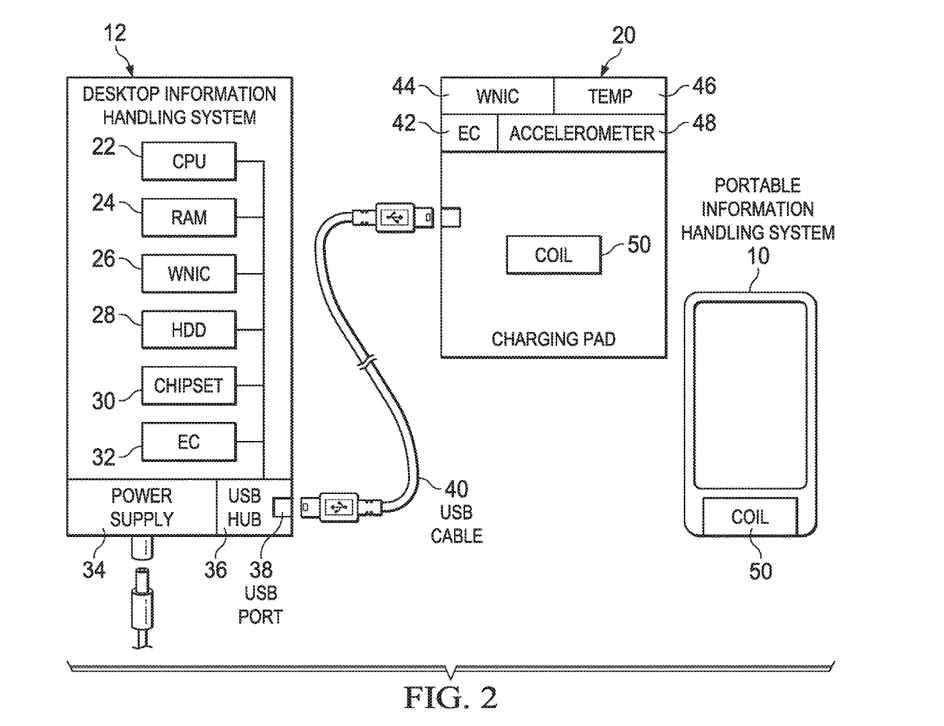
FIG. 2 depicts a block diagram of a system for coordinating charging through a charging pad.

Referring now to FIG. 2, a block diagram depicts a system for coordinating charging through a charging pad 20. Desktop information handling system 12 hosts power to charging pad 20 through a peripheral port, such as a Type C USB port 38 and power supply 34. In the example embodiment, information handling system 12 is depicted with processing components that cooperate to process information using power supplied by power supply 34. For example, a central processing unit (CPU) 22 executes instructions stored in random access memory (RAM) 24 to process information. A wireless network interface card (WNIC) 26 interfaces with CPU 22 and supports wireless communication with external devices, such as wireless local area networks (WLANs) and wireless personal area networks (WPANs). A hard disk drive (HDD) 28 or other persistent storage device stores information and applications, such as an operating system that boots from an off power state to bring the information handling system to an operational state. A chipset 30 includes a number of microprocessors and firmware elements that coordinate communication and interactions between the processing components. For example, chipset 30 includes a graphics processor that processes visual information into pixel values for presentation at a display. An embedded controller interfaces CPU 22, chipset 30 and input/output devices to interact with end users, such as through a keyboard, mouse and/or touchscreen display. Embedded controller 32 also manages power provided by power supply 34, such as by sequencing processing components between off and on states during power transitions.

During normal power-on operations, an operating system executing on CPU 22, such as WINDOWS, manages interfaces with external peripherals through WNIC 26 and USB hub 36 or other peripheral ports, such as a docking port or DisplayPort port. In the example embodiment, USB hub 36 supports USB 3.0/3.1 or future revisions and a Type C USB port 38 that provides bi-directional power transfer at up to 100 W. A power manager firmware module operating on embedded controller 32 monitors system power consumption and power transfer through USB hub 36. In the example embodiment, charging pad 20 couples to USB port 38 through a USB cable 40. The power manager of embedded controller 42 provides power to a coil 50 integrated in charging pad 20 so that coil 50 wirelessly transfers power to a coil 50 disposed in portable information handling system 10 with electromagnetic coupling. The rate of power transfer is managed by embedded controller 32 to maintain power consumption constraints of information handling system 12. In the example embodiment, charging pad 20 is depicted as a standalone peripheral, however, in alternative embodiments, charging pad 20 is integrated in a display stand or other peripheral structure.

Charging pad 20 includes an embedded controller 42 that manages application of power to coil 50 and communication with information handling system 12. In various embodiments, charging pad 20 includes a wireless network interface card 44 and a variety of sensors to detect placement of portable information handling system 10 and monitor power transfer, such as a temperature sensor 46, an accelerometer 48, a weight sensor and a magnetometer. Upon detection of a portable device placed proximate coil 50, embedded controller 42 establishes power transfer from information handling system 12 and applies power to coil 50 to initiate wireless power transfer. A power manager executing on embedded controller 42 communicates with information handling system 12 through USB cable 40 or through a wireless communication using WNIC 44, such as through Bluetooth. Based upon communications relating to available power transfer, a battery charge time for the portable information handling system 10 is predicted and presented to the end user. For example, battery charge time may be presented at either or both of portable information handling system 10 and information handling system 12 by coordinating available charging power, power transfer rate and battery charge state of portable information handling system 10.

Figure 3:
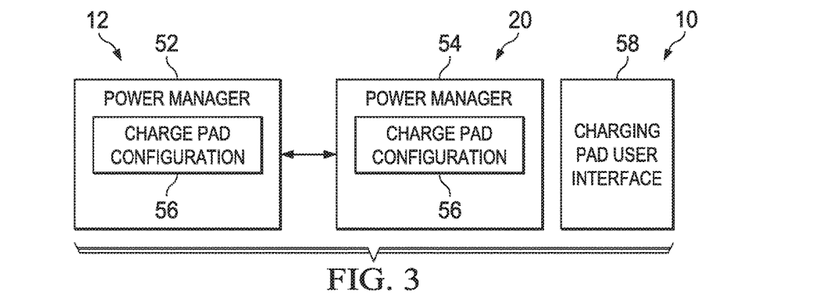
FIG. 3 depicts a block diagram of power managers that exchange configuration information for charging at a charging pad where a source information handling system transitions between low power states.

Referring now to FIG. 3, a block diagram depicts power managers 52 and 54 that exchange configuration information for charging at a charging pad 20 where a source information handling system 12 transitions between low power states. For example, power manager 52 executes on embedded controller 32 of power source information handling system 12 and maintains charge pad configuration information 56. Upon establishing communication with power manager 54 executing on charging pad 20 embedded controller 42, power managers 52 and 54 exchange charge pad configuration information 56 that defines power transfer parameters for plural power states of source information handling system 12. Charge pad configuration information 56 is established through a charge pad user interface 58 that may be presented on source information handling system 12 or a portable information handling system 10 that is accepting power. For example, an operating system of source information handling system 12 accesses flash memory of power manager 52 to set charge pad configuration information 56. In one example embodiment, charging pad user interface 58 is presented a portable information handling system 10 to accept configuration information that is in turn communicated through a wireless network interface to power manager 52 and then to power manager 54. Charge pad configuration information may include a maximum charge rate associated with an identifier of portable information handling system 10 and a range of charge rates at which source information handling system 12 may provide power transfer.

During operations with source information handling system 12 in a power on state, such as ACPI S0/S1, power manager 52 determines system load and compares system load with available power to determine a maximum power transfer rate. Power manager 52 communicates the maximum power transfer to power manager 54 and portable information handling system 10 to determine and present a charge time to the end user. If after power transfer is initiated source information handling system 12 transitions to a low power state, such as ACPI S3, S4 or S5, power manager 52 recalculates available power and coordinates an adjustment to power transfer based upon the available and maximum power transfer rates of the charge pad configuration 56. For example, in a low power state embedded controller 32 of source information handling system 12 maintains power for transfer from USB port 36 at a 100 W rate and charging pad 20 draws power at the lower of the 100 W maximum or the maximum rate at which portable information handling system 10 draws power through wireless charging. As power consumption changes at source information handling system 12, power available is updated at charging pad 20 to adjust charge rate for a maximum rate that falls within power constraints of source information handling system 12.

Once charge pad configuration information 56 is exchanged, embedded controller 42 of charging pad 20 enables power transfer based upon stored configuration information when source information handling system 12 is in a low power state. For example, upon detection of portable information handling system 10 proximate coil 50 of charging pad 20, power manager 54 sends an interrupt through USB cable or by a wireless communication that wakes embedded controller 32 to execute power manager 52. Power manager 54 requests power transfer at the maximum level of configuration information 56 so that power transfer is available at coils 50. Once power transfer is initiated, charging pad sends a wireless message to portable information handling system 10 that defines the power transfer rate and/or a charging time based upon the battery state of portable information handling system 10. A user interface at portable information handling system 10 presents the charge time to the end user to let the end user know that charge is taking place and when charge will be complete. Once charge is complete, power managers 52 and 54 coordinate power cutoff. In one embodiment, configuration information 56 manages charge based upon a time setting. For example embedded controller 32 wakes at a configured time and wakes embedded controller 42 to determine if a portable information handling system 10 is placed proximate coil 50. If so, a top-off charge is provided, such as early in the morning right before the end user typically takes his portable information handling system off charge pad 20.

Figure 4:
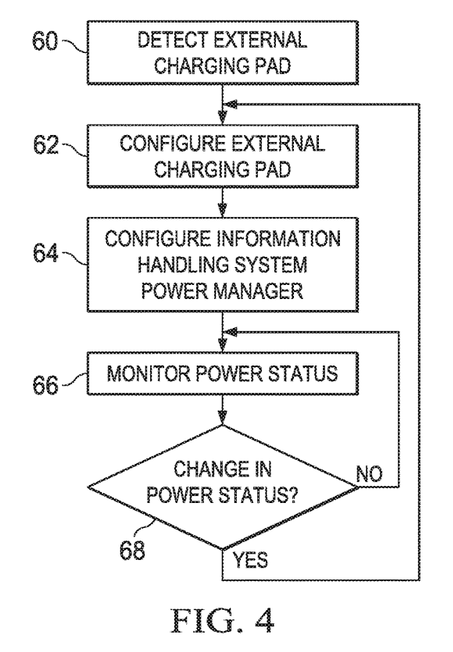
FIG. 4 depicts a flow diagram of a process for coordinating charging by a source information handling system through a charging pad.

Referring now to FIG. 4, a flow diagram depicts a process for coordinating charging by a source information handling system 12 through a charging pad 20. The process starts at step 60 with detection of portable information handling system 10. At step 62, configuration is exchanged to define charging constraints for power available at charging pad 20. Once configuration information is exchanged, the process continues to step 64, power manager 52 configures power transfer to the lesser of the maximum available power or the maximum power that charging pad 20 can transfer to portable information handling system 10. At step 66, power manager 52 monitors power transfer and power load to ensure that power constraints of source information handling system 12 are maintained. If at step 68 a change in power status has occurred, the process returns to step 62 to configure power transfer within system power constraints. If at step 68 no change has occurred, the process continues monitoring power status at step 66.

Figure 5:
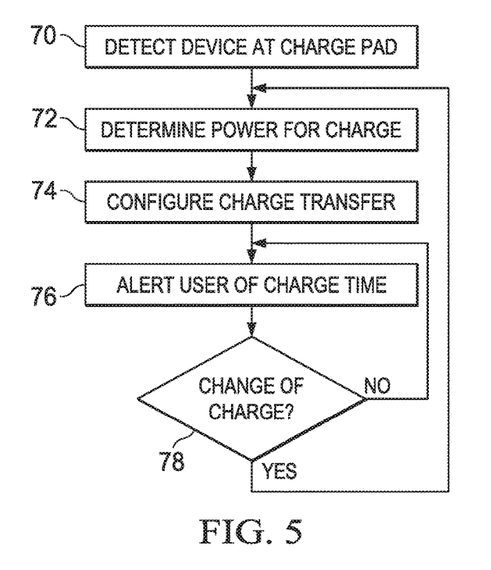
FIG. 5 depicts a flow diagram of a process for monitoring charge time with variable charge power provided from a source information handling system.

Referring now to FIG. 5, a flow diagram depicts a process for monitoring charge time with variable charge power provided from a source information handling system 12. The process starts at step 70 with detection of a device at charging pad 20, such as with an accelerometer, wireless communication, magnetometer or a weight switch. At step 72 a power transfer rate is determined for charging the portable information handling system, such as based upon available power at the source and charge state of the portable system. At step 74, charge transfer is configured between power managers 52 and 54, such as the rate at which power transfer will occur and an available power transfer range. At step 76, an alert issues to the end user that indicates a charge time based upon the available power transfer and the battery state of the portable system. At step 78, a determination is made of whether the charge time has changed, such as due to a reduced or increased charge rate. If yes, the process returns to step 72 to determine an adjusted charge time and provide the adjusted charge time to the end user. If no, the process returns to step 76 to continue monitoring charge time.

Figure 6:
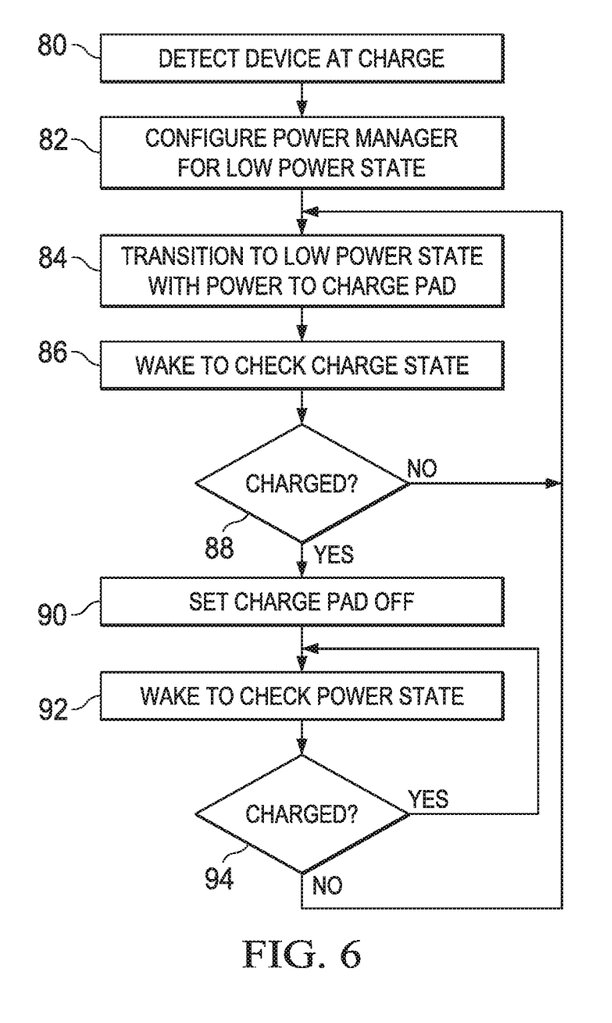
FIG. 6 depicts a flow diagram of a process for managing charging at a charge pad with a source information handling system in a low power state.

Referring now to FIG. 6, a flow diagram depicts a process for managing charging at a charge pad 20 with a source information handling system 12 in a low power state. The process starts at step 80 with detection of a portable information handling system at charge pad 20. At step 82, configuration information is exchanged for operating the charge pad with the information handling system 12 in a low power state. In one embodiment, configuration is accomplished in response to an interrupt that issues to the source information handling system 12, resulting in a temporary wake state that allows configuration to take place. At step 84, source information handling system 12 transitions to a low power state with power still applied at charging pad 20 according to the configuration information. Power transfer from the source information handling system 12 is managed by embedded controller 32 or, in an alternative embodiment, with logic in USB hub 38. At step 86, source information handling system 12 wakes, such as based on a time period or an expected time to full charge, and checks the charge state of the portable device receiving charge from charging pad 20. If not charged, the process returns to step 84 to continue monitoring charge state. If charged, the process continues to step 90 to turn off power to charge pad 20. At step 90, source information handling system 12 wakes to check a charge state of a portable system located at charge pad 20. For example, embedded controller 32 wakes at periodic intervals or at times defined in the charge pad configuration information. If a device detected at charge pad 20 needs charge, the process returns to step 84 to initiate charge and transition to a low power state. If not, the process returns to step 92 to continue monitoring for devices at charge pad 20 that need charge.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions to process information;
   a memory disposed in the housing and interfaced with the processor, the memory operable to store the information;
   a power supply disposed in the housing and operable to accept external power and convert the external power for powering the processor and memory;
   an embedded controller interfaced with the power supply and operable to manage application of power to the processor and memory;
   a communication hub supporting one or more communication ports, the one or more communication ports having a data and power interface to interact with an external device through a cable;
   an external charging pad interfaced with a communication hub port, the external charging pad having a coil configured to provide wireless power transfer to a portable device resting on the coil; and
   a power manager stored in non-transitory memory associated with the embedded controller, the power manager operable to coordinate power transfer from the power supply to the charging pad independent of a power state of the processor and memory, the charging pad transferring the power to an external device.

2. The information handling system of claim 1 wherein the power manager dynamically determines power available for transfer to the charging pad based upon information handling system power use and applies the determined power to the charging pad.

3. The information handling system of claim 2 further comprising a user interface presented at a display device, the user interface presenting a charge time for the portable device based upon the determined power.

4. The information handling system of claim 1 wherein the power manager monitors power drawn at the charging pad and automatically turns off power to the charging pad at predetermined power draw conditions.

5. The portable information handling system of claim 1 further comprising a portable device detector integrated in the charging pad and operable to detect a portable device on the charging pad, the portable device detector interfaced with the power manager to communicate presence or absence of a portable device on the charging pad.

6. The information handling system of claim 1 further comprising an embedded controller integrated in the charging pad and having a power manager stored in non-transitory memory, the charging pad power manager exchanging configuration information with the information handling system power manager to configure power transfer from the charging pad coil.

7. The information handling system of claim 6 wherein the configuration information comprises settings for power transfer.

8. The information handling system of claim 6 wherein the configuration information comprises charge times at which charge power is applied to the charging pad.

9. A method for charging a portable information handling system, the method comprising:
coupling a data cable from an information handling system to a charging pad, the data cable providing power to the charging pad;
quantifying at the information handling system power available for transfer to the charging pad;
exchanging configuration information between the information handling system and charging pad, the configuration information defining power transfer to the charging pad in plural power states of the information handling system;
detecting a portable device disposed on the charging pad; and
in response to the detecting, transferring power from the information handling system through the data cable to the charging pad according to the configuration information and power state, the charging pad transferring the power to the portable information handling system.

10. The method of claim 9 further comprising:
placing a processor of the information handling system in a low power state;
in response to detecting a portable device disposed on the charging pad, sending an interrupt through the data cable to a power manager of the information handling system; and
in response to the interrupt, initiating power transfer through the data cable according to the configuration information while maintaining a processor of the information handling system in the low power state.

11. The method of claim 10 further comprising:
placing a processor of the information handling system in an operational power state;
in response to detecting a portable device disposed on the charging pad, determining a power available for transfer from the information handling system based upon power consumption at the information handling system;
initiating power transfer through the data cable according to the configuration information and the power available for transfer from the information handling system; and
presenting at a display a charge time for the portable device based upon the power available for transfer from the information handling system.

12. The method of claim 9 wherein the configuration information comprises a time of day at which power transfer is applied to the charging pad.

13. The method of claim 9 wherein detecting a portable device on the charging pad further comprises detecting an acceleration at the charging pad.

14. The method of claim 9 wherein the charging pad is integrated in a stand of the information handling system.

15. An information handling system comprising:
a housing;
a processor disposed in the housing and operable to process information;
memory disposed in the housing and interfaced with the processor, the memory operable to store information;
a display integrated in the housing and interfaced with the processor, the display operable to present information as visual images;
a power manager integrated in the housing and operable to apply power to support the processor, memory and display; and
a stand coupled with the housing and configured to hold the display in a viewing position; and
a charging pad integrated in the stand and having a coil to wirelessly charge a portable device;
wherein the power manager coordinates power transfer to the charging pad independent of a power state of the processor and memory by communicating configuration information to the charging pad with the processor in a power up state, storing the configuration information at the charging pad, and referencing the stored configuration information to draw power from the power manager if the processor is in a powered down state, the power drawn for transfer from the charging pad to a portable device.

16. The information handling system of claim 15 further comprising an embedded controller integrated with the charging pad, the power manager and embedded controller exchanging configuration information that defines charging pad operation during processor low power states.

17. The information handling system of claim 16 wherein the configuration information further comprises a time of day for the charging pad to provide charging power.

18. The information handling system of claim 16 further comprising a USB hub interfaced with the power manager, the USB hub providing power to the charging pad.

19. The information handling system of claim 18 wherein the power manager is further operable to determine an available charging power for the charging pad and present a charging time at the display for a portable device detected at the charging pad.

20. The information handling system of claim 18 wherein the charging pad embedded controller detects a portable device placed on the charging pad and, in response to detecting the portable device, issues an interrupt to the power manager to request power without changing a power state of the processor.

* * * * *